3,021,333
SUBSTITUTED NITROTHIAZOLYL PIPERAZINES

David B. Reisner, Cedar Grove, and John V. Scudi, Springfield, N.J., assignors to Wallace & Tiernan Incorporated, Belleville, N.J., a corporation of Delaware
No Drawing. Filed Jan. 13, 1960, Ser. No. 2,137
4 Claims. (Cl. 260—268)

This invention relates to novel piperazine derivatives and particularly to substituted nitrothiazolyl piperazines. These compounds are all useful for the treatment of certain protozoan infections. More specifically, the compounds according to this invention are effective as trichomonacides, particularly in preventing the growth and killing of *Trichomonas vaginalis* organisms as hereinafter more particularly set forth. These compounds are all also effective against *Trichomonas foetus* organisms.

The substituted nitrothiazolyl piperazines provided by the invention may be represented by the general formula

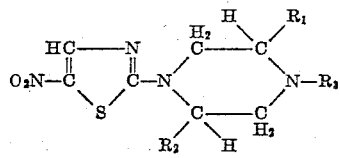

wherein $R_1$ and $R_2$ are each selected from the group consisting of hydrogen and lower alkyl, and $R_3$ is selected from the group consisting of hydrogen, lower alkyl, hydroxy lower alkyl, lower alkanoyl, phenyl lower alkanoyl, benzoyl, halogeno lower alkanoyl, carbamyl, carbo-lower alkoxy, lower alkyl-sulfonyl, and lower alkanoyl-amino-phenylene-sulfonyl; and the non-toxic acid addition salts of said compounds in which R is selected from the group consisting of hydrogen, lower alkyl and hydroxy lower alkyl.

Production of the novel substituted nitrothiazolylpiperazines is readily achieved by the condensation of 2-bromo-5-nitrothiazole and substituted piperazines or by alkylation or acylation of 1 - (5 - nitro-2-thiazolyl) piperazine or alkyl substituted 1-(5-nitro-2-thiazolyl) piperazines. The 1 - (5-nitro-2-thiazolyl) piperazine or alkyl substituted 1-(5-nitro-2-thiazolyl) piperazines can be secured by hydrolyzing the corresponding 4-acetyl compound or any related 4-acyl compound.

The following examples are given to illustrate the practice of the present invention, but are not to be construed as limiting.

EXAMPLE 1

1 - (5 - nitro-2-thiazolyl)-4-acetylpiperazine (in which $R_1$ and $R_2$ are each hydrogen and $R_3$ is an acetyl group [$CH_3 \cdot CO$—], an example of lower alkanoic acid acyl). A mixture of 103.5 grams of 2-bromo-5-nitrothiazole and 90 g. of N-acetylpiperazine hydrochloride, 125 g. of sodium bicarbonate and 800 ml. of ethanol is stirred and heated under reflux for 30 minutes. It is cooled to 20°, filtered and washed successively with 350 ml. of ethanol, a solution of 300 ml. of water and 30 ml. of glacial acetic acid and finally 200 ml. of water. The crude product is triturated with 250 ml. of acetone, washed with 150 ml. of ether and dried at 80° to constant weight; M.P. 183–187°, 97.8% yield. After recrystallization from aqueous acetic acid, alcohol or nitromethane, the melting point is raised to 189–190°.

EXAMPLE 2

1-(5-nitro-2-thiazolyl)-piperazine (in which $R_1$, $R_2$ and $R_3$ are each hydrogen). A solution of 25 g. of 1-(5-nitro-2-thiazolyl)-4-acetylpiperazine (the product of Example 1 above) in 150 ml. of water and 45 ml. concentrated sulfuric acid is heated under reflux for 30 minutes and filtered. The pH of the filtrate is adjusted to 8 with concentrated $NH_4OH$ (110 ml.) keeping the temperature below 40°. The solid is removed by filtration and washed well with water. After drying in vacuo over anhydrous phosphorus pentoxide, the product is recrystallized from ethanol; M.P. 158.5–159.5°; 61% yield.

EXAMPLE 3

1 - (5 - nitro-2-thiazolyl)-4-methylpiperazine (in which $R_1$ and $R_2$ are each hydrogen and $R_3$ is lower alkyl [$CH_3$—]. A solution of 3.0 g. of N-methylpiperazine in ethanol is treated with a solution of 6.3 g. of 2-bromo-5-nitrothiazole in a mixture of ether and ethanol. The precipitate is removed and the base liberated with dilute sodium hydroxide. The yellow precipitate is removed by filtration. It melts at 120–121°, 60% yield.

EXAMPLE 4

1-(5-nitro-2-thiazolyl)-4-diethylcarbamylpiperazine (in which $R_1$ and $R_2$ are each hydrogen and $R_3$ is a diethyl carbamyl group [$(C_2H_5) \cdot NCO$—] an example of a carbamyl group). A mixture of 8.8 g. of 1-(5-nitro-2-thiazolyl)-piperazine (the product of Example 2 above), 9.0 g. of diethylcarbamyl chloride, 25 ml. triethylamine and 100 ml. of benzene is heated under reflux for 2 hours and then allowed to stand at ordinary temperature for 18 hours. It is concentrated to dryness at reduced pressure and the residue is heated with benzene. After filtering off the triethylamine hydrochloride, the filtrate is charcoaled, concentrated and treated with an equal volume of hexane. The chilled mixture is filtered to give yellow needles, M.P. 116–117°, 64.8% yield.

EXAMPLE 5

1 - (5 - nitro-2-thiazolyl)-4-heptylpiperazine hydrobromide (in which $R_1$ and $R_2$ are each hydrogen and $R_3$ is a normal heptyl group [$CH_3(CH_2)_6$—], this being another example of a lower alkyl group and the compound as a whole being also an example of an acid salt in an instance in which $R_3$ is an alkyl group). A mixture of 10.5 g. of 2-bromo-5-nitrothiazole, 9.2 g. of N-heptylpiperazine (normal heptyl) and 75 ml. of ethanol is heated under reflux for 1 hour, cooled and filtered. The product melts at 260–261° dec. Recrystallization from aqueous ethanol gives 14.5 g. of purified product; melting point remains unchanged.

The N-heptylpiperazine used as starting material in this example is prepared in the following manner: N-carbethoxypiperazine is alkylated with normal heptyl bromide in ethanol in the presence of sodium carbonate to give 1-carbethoxy-4-heptylpiperazine, B.P. 120° at 0.3 mm. The latter is converted to N-heptylpiperazine, B.P. 116° at 7 mm., by hydrolysis with concentrated hydrochloric acid.

EXAMPLE 6

1-(5-nitro-2-thiazolyl)-4-β-hydroxyethylpiperazine (in which $R_1$ and $R_2$ are each hydrogen and $R_3$ is β-hydroxyethyl [$CH_2OH \cdot CH_2$—], an example of a hydroxy-lower alkyl group). A mixture of 10.5 g. of 2-bromo-5-nitrothiazole, 6.5 g. of N-β-hydroxyethylpiperazine and 75 ml. of ethanol is heated under reflux for 45 minutes. It is cooled and filtered. The residue is treated with 150 ml. of water, filtered, and the filtrate is neutralized with sodium hydroxide. The product, M.P. 124–126°, is recrystallized from water, giving 7.0 g. of yellow crystals, M.P. 128–128.5°.

EXAMPLE 7

1-(5-nitro-2-thiazolyl)-4-carbethoxypiperazine (in which $R_1$ and $R_2$ are each hydrogen and $R_3$ is a carbethoxy group [$C_2H_5OCO-$], an example of a carbo-lower alkoxy group). The procedure of Example 1 is followed using N-carbethoxypiperazine in place of N-acetylpiperazine. The product melts at 134–134.5° after recrystallization from ethanol; 78.6% yield.

EXAMPLE 8

1-(5-nitro-2-thiazolyl)-4-butyrylpiperazine (in which $R_1$ and $R_2$ are each hydrogen and $R_3$ is a butyryl group [$CH_3(CH_2)_2CO-$] another example of a lower alkanoic acid acyl group with a larger number of carbon atoms than in the case of Example 1). A mixture of 2 g. of 1-(5-nitro-2-thiazolyl) piperazine (the product of Example 2 above), 3.5 ml. of butyric anhydride and 50 ml. of pyridine is allowed to stand at ordinary temperature for 18 hours. It is then poured into a mixture of ice and water and filtered. The solid is washed with water, stirred with dilute hydrochloric acid and washed again with water. The product melts at 126–128°, 72.5% yield. The melting point remains unchanged after recrystallization from a mixture of methanol and ether.

EXAMPLE 9

1-(5-nitro-2-thiazolyl)-4-benzoylpiperazine (in which $R_1$ and $R_2$ are each hydrogen and $R_3$ is a benzoyl group

an example of benzoyl). A mixture of 2 g. 1-(5-nitro-2-thiazolyl)-piperazine (the product of Example 2 above), 2.5 ml. of benzoyl chloride and 40 ml. of pyridine is warmed at about 60° for one and one-half hours. It is then poured into ice water, and the solid is removed by filtration. After washing with dilute hydrochloric acid and then water, the product (2.96 g., equivalent to a yield of 86.2%) is recrystallized from ethyl acetate (charcoal). The purified material weighs 1.87 g. and melts at 146.5–147.5°.

EXAMPLE 10

1-(5-nitro-2-thiazolyl)-4-methanesulfonylpiperazine (in which $R_1$ and $R_2$ are each hydrogen and $R_3$ is a methane-sulfonyl group [$CH_3 \cdot SO_2-$], an example of lower alkyl sulfonyl). The procedure of Example 9 is followed using 1.5 ml. of methanesulfonylchloride, 3.21 g. of 1-(5-nitro-2-thiazolyl) piperazine and 60 ml. of pyridine. The product, 3.90 g. (89% yield), melts with decomposition at 237–239°. After recrystallization from nitromethane-ether, the melting point is raised to 241.5–242.5°.

EXAMPLE 11

1-(5-nitro-2-thiazolyl)-4-(p-acetylaminobenzenesulfonyl)piperazine (in which $R_1$ and $R_2$ are each hydrogen and $R_3$ is a p-acetylaminobenzene sulfonyl group

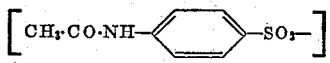

an example of lower alkanoic acid acyl-amino-phenylene-sulfonyl). Proceeding as in Example 9 using 11.7 g. of p-acetylaminobenzenesulfonyl chloride, 10.7 g. of 1-(5-nitro-2-thiazolyl)piperazine and 125 ml. of pyridine, 20 g. (97% yield) of product is obtained. After two recrystallizations from nitromethane, the M.P. of purified material is 253–254° dec.

EXAMPLE 12

1-(5-nitro-2-thiazolyl-2,5-dimethyl-4-acetylpiperazine (in which $R_1$ and $R_2$ are each methyl and $R_3$ is an acetyl group [$CH_3 \cdot CO-$], illustrating the form in which $R_1$ and $R_2$ are each lower alkyl and $R_3$ is lower alkanoic acid acyl). The procedure of Example 1 is followed using 8.5 g. of 1-acetyl-2,5-dimethylpiperazine hydrochloride, 8.4 g. of 2-bromo-5-nitrothiazole, 10 g. of sodium bicarbonate and 30 ml. of ethanol. The purified product melts at 160–161°.

The intermediate, 1-acetyl2,5-dimethylpiperazine hydrochloride, is prepared by acetylating trans 2,5-dimethyl-piperazine with acetic anhydride. The acetylated product is isolated as a hydrochloride and used in the reaction with 2-bromo-5-nitrothiazole without further purification.

EXAMPLE 13

1-(5-nitro-2-thiazolyl)-4-phenylacetylpiperazine (in which $R_1$ and $R_2$ are each hydrogen and $R_3$ is a phenylacetyl group

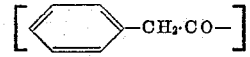

an example in which $R_3$ is phenyl lower alkanoic acid acyl). A mixture of 4.08 g. 5-nitro-2-thiazolylpiperazine, 2 g. of triethylamine, 2.85 g. of phenylacetylchloride and 50 ml. of dimethyl formamide is heated at 60–70° for 1 hour and then at 90° for 15 minutes. After cooling it is treated with dilute hydrochloric acid, filtered, washed with water and dried. After recrystallization from nitromethane, the purified product melts at 180.5–181.5°.

EXAMPLE 14

1-(5-nitro-2-thiazolyl)-4-dichloroacetylpiperazine (in which $R_1$ and $R_2$ are each hydrogen and $R_3$ is a dichloroacetyl group [$CHCl_2 \cdot CO-$], an example in which $R_3$ is halogeno lower alkanoic acid acyl). Using essentially the same procedure of Example 13, 5-nitro-2-thiazolyl piperazine (8.16 g.) is dichloroacetylated with 5.8 g. of dichloroacetylchloride. The product melts at 149–150° after recrystallization from glacial acetic acid.

Throughout this application all temperatures stated should be understood to be in degrees centigrade.

In general, hydrochlorides, hydrobromides and other similar non-toxic acid addition salts of the compounds may be made when the nitrogen at the 4 position in the piperazine ring is basic, i.e. when $R_3$ is one of the substituents selected from the group consisting of hydrogen, lower alkyl and hydroxy lower alkyl groups. All such compounds may be made by the process as set out in Example 5 hereof or by known methods of producing acid addition salts.

It has been found that such compounds have potent trichomonacidal properties which apparently reside in the fundamental nucleus 5-nitro-2-thiazolylpiperazine. The addition of substituents to this nucleus as described herein seems to produce some differences in the physical properties of the compounds; but such additions produce only a difference is degree, but not in kind as to the antimicrobial activity of the respective compounds.

The trichomonacidal activity of the new compounds of this invention was determined by a series of experiments which established the minimal inhibitory concentration of these compounds. Minimal inhibitory concentration, as used above, is defined as the minimal concentration of an agent capable on contact of preventing the growth of and of killing Trichomonas vaginalis organisms.

In these experiments, 0.1 ml. of a 48 hour culture of a virulant strain of Trichomonas vaginalis was permitted to grow on Simplified Trypticase Serum Medium as described by Kupferberg, International Record of Medicine and General Practice Clinics, volume 168, pages 709–717, 1955, in the presence of increasing amounts of the compound under test. The organisms were allowed to grow at 37° C. for 48 hours. When no inhibitory compound was used the organism continued to grow, but when the organisms were brought into contact with the compounds described in this invention in concentrations shown in Table 1, which follows, the Trichomonas vaginalis organisms were killed.

Table 1

| Comp. of Example No. | R₁ | R₂ | R₃ | Minimal Inhibitory Concentration, gamma per cc. |
|---|---|---|---|---|
| 1 | H | H | CH₃CO | 1 |
| 2 | H | H | H | 1 |
| 3 | H | H | CH₃ | 1.5 |
| 4 | H | H | (C₂H₅)₂NCO | 1 |
| 5 | H | H | C₇H₁₅ | 3 |
| 6 | H | H | HOCH₂CH₂ | 1.5 |
| 7 | H | H | COOC₂H₅ | 3 |
| 8 | H | H | CH₃CH₂CH₂CO | 37 |
| 9 | H | H | C₆H₅CO | 37 |
| 10 | H | H | CH₃SO₂ | 12 |
| 11 | H | H | p-CH₃CO·NH·C₆H₄SO₂ | 111 |
| 12 | CH₃ | CH₃ | CH₃CO | 12 |
| 13 | H | H | C₆H₅·CH₂CO | 4 |
| 14 | H | H | Cl₂CH·CO | 4 |
| Control | | | No drug added | luxuriant growth. |

The closest art which has come to the attention of the applicants in this case is the U.S. Patent to Hultquist et al., No. 2,543,972 granted March 6, 1951, which discloses the compound

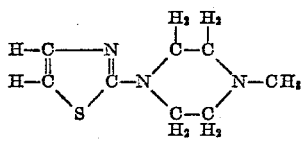

This compound was tested in exactly the same way as the compounds listed in Table 1 above, resulting in luxuriant growth of the *Trichomonas vaginalis* organisms, even when a high concentration of 1000 gamma per cc. was used of this drug being tested. There was no apparent inhibition of the life or growth of the organism. This test was taken as evidence of the importance of the nitro group at the 5 position of the thiazolyl ring.

This application is a continuation-in-part of, and intended as a substitute for, our prior and copending application, Ser. No. 794,499 filed February 20, 1959, which is now abandoned in favor of the present application.

The specific proportions given in the several examples are intended to be illustrative and the terms used in describing and claiming the invention have been used in their descriptive sense and not as terms of limitation. It is intended that all equivalents of the terms used shall be included within the scope of the appended claims.

What is claimed is:
1. A compound selected from the group consisting of those having the formula:

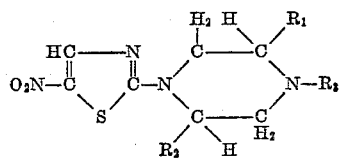

wherein $R_1$ and $R_2$ are each selected from the group consisting of hydrogen and lower alkyl, and $R_3$ is selected from the group consisting of hydrogen, lower alkyl, hydroxy lower alkyl, lower alkanoyl, phenyl lower alkanoyl, benzoyl, halogeno lower alkanoyl, carbamyl, carbo-lower alkoxy, lower alkylsulfonyl, and lower alkanoyl-aminophenylene-sulfonyl; and the non-toxic acid addition salts of said compounds in which $R_3$ is selected from the group consisting of hydrogen, lower alkyl and hydroxy lower alkyl.

2. The compound 1-(5-nitro-2-thiazolyl)piperazine having the formula:

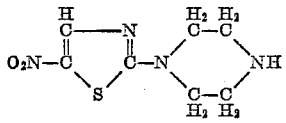

3. The compound 1-(5-nitro-2-thiazolyl)-4-acetylpiperazine having the formula:

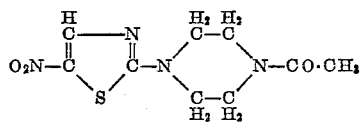

4. The compound 1-(5-nitro-2-thiazolyl)-4-diethylcarbamylpiperazine having the formula:

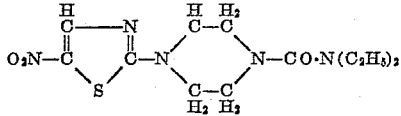

References Cited in the file of this patent
UNITED STATES PATENTS

| 2,562,036 | Hultquist et al. | July 24, 1951 |
| 2,602,796 | Stewart | July 8, 1952 |

FOREIGN PATENTS

| 533,657 | Canada | Nov. 27, 1956 |